US011505144B2

(12) United States Patent
Morita (10) Patent No.: US 11,505,144 B2
(45) Date of Patent: Nov. 22, 2022

(54) POWER SUPPLY SYSTEM (71) Applicant: DENSO CORPORATION, Kariya (JP)

(72) Inventor: Tetsuo Morita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/226,374

(22) Filed: Apr. 9, 2021

(65) Prior Publication Data

US 2021/0316679 A1 Oct. 14, 2021

(30) Foreign Application Priority Data

Apr. 9, 2020 (JP) .............................. JP2020-070355

(51) Int. Cl.
B60R 16/033 (2006.01)
H02J 7/34 (2006.01)
H02H 3/08 (2006.01)
H02J 7/14 (2006.01)
H02J 1/10 (2006.01)

(52) U.S. Cl.
CPC ............. *B60R 16/033* (2013.01); *H02H 3/08* (2013.01); *H02J 1/102* (2013.01); *H02J 7/1438* (2013.01); *H02J 7/34* (2013.01)

(58) Field of Classification Search
CPC ...... H02J 7/34; H02J 7/00; H02J 1/082; H02J 7/0068; B60R 16/0033; H02H 3/06–10

USPC ........................................................ 307/10.1
See application file for complete search history.

(56) References Cited

U.S. PATENT DOCUMENTS

| 2019/0312449 | A1* | 10/2019 | Matsushita | ........... H02J 7/0047 |
| 2020/0216002 | A1  | 7/2020  | Mazaki et al. | |
| 2020/0262308 | A1* | 8/2020  | Sasahara | ................. B60L 50/64 |
| 2020/0313457 | A1* | 10/2020 | Kozuki | ................. H02J 7/0047 |

* cited by examiner

Primary Examiner — Rexford N Barnie
Assistant Examiner — Swarna N Chowdhuri
(74) Attorney, Agent, or Firm — Oliff PLC (57) ABSTRACT In a power supply system, a first route includes a first power supply connected to a first load. A second route includes a second power supply connected to a second load. A connection path connects the first and second routes at a connection point. The first power supply includes a voltage generator generating an operating voltage operating the first and second loads. The second power supply includes an electrical storage device charging based on power supplied from the voltage generator. A switching circuit includes a first switch having a diode component with an anode and a cathode being directed to the electrical storage device and the connection path, respectively, and is disposed between the connection point and the electrical storage device. A switch state controller outputs a switch-off command to the first switch when the electrical storage device is in the fully charged condition.

4 Claims, 6 Drawing Sheets

POWER SUPPLY SYSTEM

CROSS-REFERENCE TO RELATED APPLICATION

This patent application is based on and claims priority to Japanese Patent Application No. 2020-070355, filed on Apr. 9, 2020 in the Japan Patent office, the entire disclosure of which is hereby incorporated by reference herein.

BACKGROUND

Technical Field

The present disclosure relates to a power supply system.

Related Art

A power supply system recently used in vehicles can control behavior of the vehicle. In such a power supply system, when an abnormality occurs in a load performing an essential function to drive the vehicle, such as an electric brake, an electric steering device, etc., the function is entirely lost thereby stopping the vehicle. To avoid entire loss of the function during driving of the vehicle when such an abnormality occurs, a conventional system employs first and second loads that perform a common function.

For example, a conventional power supply system has a first route including a first power supply connected to a first load and a second route including a second power supply connected to a second load. In the system, an inter-route switch is disposed in a connection path connecting these first and second routes with each other. The inter-route switch is switched off when it is determined by a controller that an abnormality has occurred in one of these first and second routes. With this, one of the first and second loads disposed in an applicable one of the first and second routes operating in a normal condition continuously drives the vehicle thereby securing a function necessary for driving the vehicle.

In the known power supply system, the power supply of one of the first and second routes may be configured by a voltage generator employing a DC-DC converter while the other power supply of the other one of the first and second routes may be configured by an electrical storage device. With such a configuration, it is possible to continuously supply sufficient power in each of the first and second routes while allowing the electrical storage device to appropriately charge. However, the electrical storage device is likely to redundantly charge by receiving power supplied from the voltage generator.

Hence, the present disclosure has been made to address the above-described problem and it is an object of the present disclosure to provide a novel power supply system that includes a voltage generator and an electrical storage device capable of either suppressing or reducing overcharge of the electrical storage device.

SUMMARY

Accordingly, one aspect of the present disclosure provides a novel power supply system that comprises a first route including a first power supply connected to a first load, a second route including a second power supply connected to a second load, and a connection path connecting the first and second routes with each other. The connection path connects to the second route at a connection point. The first power supply includes a voltage generator generating an operating voltage operating each of the first load and the second load. The second power supply includes an electrical storage device charging based on power supplied from the voltage generator. The power supply system further comprises a switching circuit disposed in the second route between the connection point and the electrical storage device. The switching circuit includes a switch having a diode component with an anode and a cathode being directed to the electrical storage device and the connection path, respectively. The power supply system further comprises an electric charge determiner to determine whether the electrical storage device is in a fully charged condition and a switch state controller to output a switch-off command to the switch when the electric charge determiner has determined that the electrical storage device is in the fully charged condition.

Hence, according to one aspect of the present disclosure, since mutual power supply between the first and second routes is enabled, power can be redundantly supplied from the first power supply and the second power supply to the first load and the second load. Specifically, since the first power supply includes the voltage generator that generates the operating voltage that operates each of the first load and the second load, and the second power supply includes an electrical storage device that can charge (i.e., store electric charges (hereinbelow the same)) based on power supplied from the voltage generator, power is redundantly supplied to each of the loads while allowing the electrical storage device to appropriately charge.

Specifically, there can be a risk that the electrical storage device overcharges based on power supplied from the voltage generator.

In view of this, according to one aspect of the present disclosure, the opening-closing switch (i.e., the switch) having the diode component is disposed between the connection point at which the connection path connects to the second route, and the electrical storage device. A forward direction of the diode component is extended from the electrical storage device to the connection path. With this, it is determined whether the electrical storage device is in a fully charged condition, and if the determination is positive (i.e., the electrical storage device is in the fully charged condition), a switch-off command is output to the switch and switches off the switch. With this, the electrical storage device stops charging when it is in the fully charged condition while appropriately discharging due to the diode component. As a result, the energy storage device can avoid or reduce the overcharging.

According to another aspect of the present disclosure, the power supply system further comprises an inter-route switch disposed in the connection path, and an abnormality determiner to determine whether an abnormality has occurred in the first route. The switch state controller outputs a switch-off command to the inter-route switch when the switch is in the switched-off state in response to the switch-off command transmitted from the switch state controller and the abnormality determiner has determined that the abnormality has occurred in the first route.

Hence, according to another aspect of the present disclosure, since an inter-route switch is disposed in a connection path connecting first and second routes with each other, the inter-route switch can be switched off to continuously operate the load in one of the systems where no abnormality has occurred when it is determined that an abnormality has occurred in the other one of the systems. For example, when it is determined that the abnormality has occurred in the first route, the inter-route switch is switched off. In such a situation, if the switch is in the switched-off state, power supply to the second load is interrupted, thereby possibly stopping continuous operation of the second load.

In view this, according to another aspect of the present disclosure, power can be continuously supplied from the second power supply to the second load via the diode component even if the switch is in a switched-off state. With this, even after the switch has entered the switched-off state, the second load can be continuously operated.

According to yet another aspect of the present disclosure, the power supply system further comprises an inter-route switch disposed in the connection path, and an abnormality determiner to determine whether an abnormality has occurred in the first route. The switch state controller outputs a switch-off command to the inter-route switch when the switch is in the switched-off state in response to the switch-off command transmitted from the switch state controller and the abnormality determiner has determined that the abnormality has occurred in the first route. The switch state controller further outputs a switch-on command to the switch after the inter-route switch has entered a switched-off state in response to the switch-off command.

Specifically, when the abnormality occurs in the first route, the inter-route switch is switched off and power is continuously supplied from the second power supply to the second load through the diode component of the switch, an amount of power consumption in the second power supply increases due to the forward voltage of the diode component. In such a situation, since the remaining capacity of the electrical storage device included in the second power supply is limited, there is a risk that the second load cannot continuously operate due to depletion of the remaining capacity.

According to yet another aspect of the present disclosure, the switch state controller further outputs a switch-on command to the switch to bring the switch into a switched-on state after the inter-route switch has entered a switched-off state in response to the switch-off command. With this, the power consumption of the energy storage device caused by the forward voltage of the diode component is suppressed, and an operation period of the second load can be extended to a time after the switch has entered the switched-off state.

According to yet another aspect of the present disclosure, the power supply system further comprises an inductance having a given inductance component, connected in series to the inter-route switch in the connection path. The inductance component has a first given value causing a time constant of a circuit composed of the second route and the connection path to have a second given value that inhibits a voltage of the second load from decreasing to less than a lower limit of the operating voltage during a shut-off period. The shut-off period represents a period from when the abnormality determiner has determined that the abnormality has occurred in the first route to when the inter-route switch has entered a switched-off state in response to the switch-off command transmitted from the switch state controller.

Specifically, when it is determined that an abnormality has occurred in the first route, the inter-route switch is switched off and the second load is continuously operated. However, a given shut-off period is required before the inter-route switch enters the switched-off state after it is determined that the abnormality has occurred. Hence, a voltage of the second load in the route where an abnormality does not occur decreases from a lower limit of an operating voltage during the shut-off period, the second load is highly probably stopped continuously operating.

In view this, according to yet another aspect of the present disclosure, an inductance is connected in series to the inter-route switch in the connection path. Further, a time constant of a circuit composed of the second route and the connection path is designed to satisfy a condition that a voltage of the second load does not decrease to less than the lower limit of the operating voltage during the shut-off period. That is, even if the abnormality occurs in the first route, the power supply system generates a transitional voltage (i.e., a difference in voltage) between the first and second routes based on a transitional change in current caused by the abnormality and the inductance component of the inductance so as not to cause the voltage of the second load to decrease to less than the lower limit of the operating voltage. With this, the second load can be continuously operated before and after the switch enters the switched-off state.

According to another aspect of the present disclosure, each of the first load and the second load performs at least one function necessary for driving a moving body.

Specifically, in a power supply system employed in a moving body having a first load and a second load which perform respective functions necessary therefor, when an abnormality occurs in the first route and if the second load is unable to continuously operate at the time, the first load and the second load are simultaneously stopped operating, thereby disenabling continuous operation of the moving body. However, according to another aspect of the present disclosure, since the second load is continuously operated before and after the switch is switched off, the moving body can be continuously operated.

According to yet another aspect of the present disclosure, the power supply system further comprises a restricted charging request determiner to determine whether a restricted charging request for allowing the electrical storage device to charge in a restricted charging condition has been made. The switching circuit further includes a second switch having a diode component with an anode and a cathode being directed to the connection path and the electrical storage device, respectively. The second switch is connected in series to the first switch. The switch state controller outputs a switch-on command to the first switch and a switch-off command to the second switch when the restricted charging request determiner has determined that the restricted charging request has been made. The switch state controller outputs a switch-off command to the first switch and a switch-on command to the second switch when the charge determiner has determined that the electrical storage device is in the fully charged condition.

Specifically, in general, some of switching circuits are composed of a first opening and closing switch (i.e., first switch) and a second opening and closing switch (i.e., second switch) serially connected with diode components being directed reversely from each other. According to yet another aspect of the present disclosure, a charging amount in the storage device can be appropriately reduced by switching a state of each of the first switch and the second switch. Specifically, when it is determined that a restricted charging request for allowing the electrical storage device to charge in a restricted charging condition (i.e., based on a limited amount of charging current) is made, the first switch is switched on and the second switch is switched off. With this, the electrical storage device can continuously charge even based a limited amount of charging current through the diode component included in the second switch. Further, when it is determined that the electrical storage device is in a fully charged condition, the first switch is switched off and the second switch is switched on. With this, the charging of the electrical storage device can be stopped thereby limiting an amount of charge in the electrical storage device.

According to yet another aspect of the present disclosure, the restricted charging request determiner determines that the restricted charging request has been made when a raising request for raising the operating voltage generated by the voltage generator has been made.

Specifically, in a power supply system including a voltage generator and an electrical storage device, it is necessary to raise an operating voltage generated by the voltage generator in accordance with an operating state of each of the first load and the second load. As a result, the electrical storage device may sometimes overcharge when the electrical storage device charges based on the raised voltage. In view of this, according to yet another aspect of the present disclosure, when a raising request for raising an operating voltage is made, it is determined that a restricted charging request for charging in a restricted charging condition is made, and the first switch is switched on and the second switch is switched off. As a result, a forward voltage of the diode component included in the second switch suppresses an increase in voltage applied to the electrical storage device, thereby preventing or reducing an overcharge of the electrical storage device.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Figure 1:
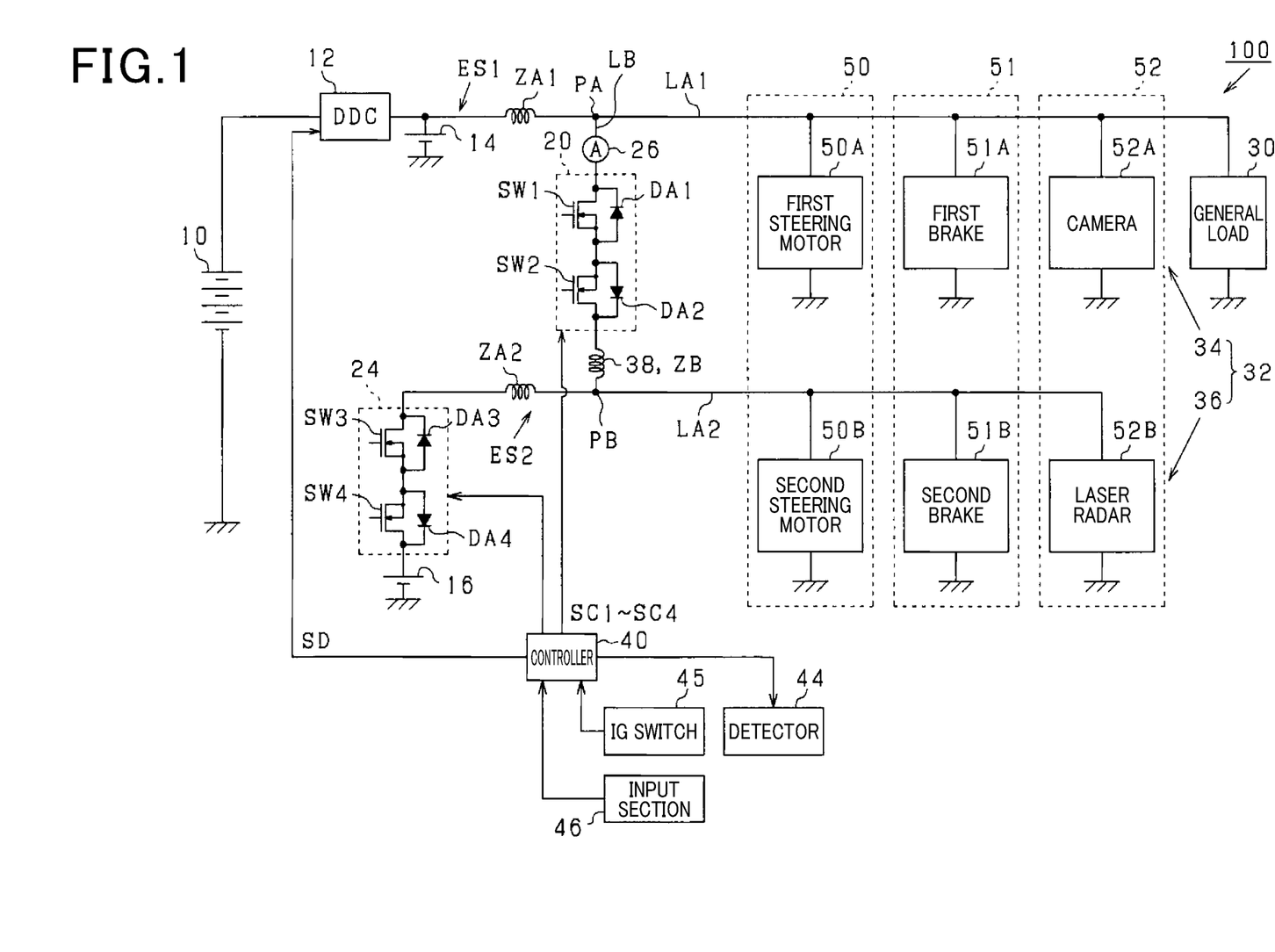
FIG. 1 is a diagram illustrating an overall structure of an exemplary power supply system according to one embodiment of the present disclosure.

Referring now to the drawings, wherein like reference numerals designate identical or corresponding parts throughout the several views thereof, and to FIG. 1, a power supply system 100 is configured to supply power to a general load 30 and a specific load 32. The power supply system 100 includes a high-voltage secondary battery 10, a DC-DC (Direct Current to Direct Current) converter (hereinafter, simply referred to as a converter) 12, and a first low-voltage secondary battery 14. The power supply system 100 also includes a second low-voltage storage battery 16, a switch unit 20, and a controller 40.

The high-voltage secondary battery 10 has a rated voltage (for example, several hundred Volts) higher than rated voltages of the first low-voltage secondary battery 14 and the second low-voltage secondary battery 16. The high-voltage secondary battery may be composed of a lithium-ion secondary battery. The converter 12 converts electric power supplied from the high-voltage storage battery 10 into electric power to provide operating voltages VM (for example, 12 volts) operating the general load 30 and the specific load 32. The converter 12 then supplies conversion results to the general load 30 and the specific load 32, respectively. Hence, the converter 12 acts as a voltage generator that generates an operating voltage VM 32 operating a specific load 32 in this embodiment of the present disclosure.

The general load 30 is an electrical load (hereinafter, simply referred to as a load), such as an air conditioner, an audio device, a power window, etc., not used in controlling driving of a vehicle as a moving body.

By contrast, the specific load 32 is a load used in controlling driving the vehicle to perform at least one function. For example, the specific load 32 includes an electric power steering device 50 that controls steering of the vehicle, an electric brake 51 that provides braking force to wheels, and a running controller 52 that monitors conditions around the vehicle or the like.

Hence, when an abnormality occurs in any one of these specific loads 32 and a function thereof is entirely lost, driving control cannot be performed. Hence, to prevent the function from being entirely lost even when the abnormality occurs, the specific load 32 is composed of the first load 34 and the second load 36 providing that function redundantly. Specifically, the electric power steering device 50 has a first steering motor 50A and a second steering motor 50B. The electric brake 51 includes a first brake 51A and a second brake 51B. The running controller 52 has a camera 52A and a laser radar 52B. Hence, the first steering motor 50A, the first brake 51A, and the camera 52A collectively correspond to the first load 34. Also, the second steering motor 50B, the second brake 51B, and the laser radar 52B collectively correspond to the second load 36.

Hence, the first load 34 and the second load 36 cooperatively realize one function. However, each of the first and second loads 34 and 36 alone is enabled to partially realize the function separately. For example, with both the first steering motor 50A and the second steering motor 50B, the electric power steering device 50 can freely perform steering of the vehicle. Further, although each of a steering speed and a steering range or the like is limited to a certain degree, these steering motors 50A and 50B can separately realize steering of the vehicle.

Hence, each of the specific loads 32 realizes a function to assist a driver who manually controls driving. Also, each of the specific loads 32 realizes functions necessary for autonomous driving that automatically controls behavior of a vehicle, such as running, stopping, etc. Accordingly, each of the specific loads 32 can be a load that performs at least one of functions necessary for driving the vehicle as well.

Further, the first load 34 is connected to the converter 12 via the first route inner path LA1. The first low-voltage storage battery 14 and the general load 30 are also connected to the first route inner path LA1. The first low-voltage storage battery 14 is, for example, composed of a lead-acid battery. Hence, according to this embodiment, the converter 12, the first low-voltage storage battery 14, the general load 30, and the first load 34 are connected with each other by the first route path LA1 and collectively constitute the first route ES1. Further, as shown, the first route inner path LA1 includes an inductance component ZA1 for the first route ES1. Hence, according this embodiment of the present disclosure, the converter 12 and the first low-voltage storage battery 14 collectively correspond to (i.e., act as) a first power supply.

Further, the second load 36 is connected to the second low-voltage storage battery 16 via the second route inner path LA2. The second low-voltage storage battery 16 is, for example, composed of a lithium-ion secondary battery. Hence, according to this embodiment, the second low-voltage storage battery 16 and the second load 36 relate to each other by the second route inner path LA2 and collectively constitute the second route ES2. Further, as shown, the second route inner path LA2 includes an inductance component ZA2 for the second route ES2. Hence, according to one embodiment of the present disclosure, the second low-voltage storage battery 16 corresponds to (i.e., acts as) a second power supply or an electrical storage device.

Further, a switch unit 20 is disposed in a connection path LB that connects each of the first and second routes with each other. Specifically, one end of the connection path LB is connected to the first route inner path LA1 at a connection point PA. The other end of the connection path LB is connected to the second route inner path LA2 at a connection point PB. The switch unit 20 includes a first switch SW1 and a second switch SW2 serially connected with each other. In the switch unit 20, the first switch SW1 is disposed closer to the first route ES1 than the second switch SW2 is. Hence, according to one embodiment of the present disclosure, the first switch SW1 and the second switch SW2 collectively correspond to (i.e., act as) an inter-route switch.

Further, in this embodiment, each of the first and second switches SW1 and SW2 is composed of an N-channel MOSFET (Metal-Oxide-Semiconductor Field-Effect Transistor) (hereinafter, simply referred to as a MOSFET). Hence, a first parasitic diode DA1 is connected parallel to the first switch SW1. A second parasitic diode DA2 is connected parallel to the second switch SW2. In this embodiment, the first and second switches SW1 and SW2 are connected in series with respective directions of the first and second parasitic diodes DA1 and DA2 being opposite to each other. Specifically, an anode of the first parasitic diode DA1 is disposed closer to the second route ES2 than a cathode thereof, and the cathode is disposed closer to the first route ES1 than the anode, respectively. Similarly, an anode of the second parasitic diode DA2 is disposed closer to the first route ES1 than a cathode thereof, and the cathode is disposed closer to the second route ES2, respectively.

Further, a current detector 26 is disposed in the connection path LB. The current detector 26 is disposed in the connection path LB closer to the first route ES1 than to the switch unit 20. The current detector 26 detects a magnitude and a direction of an inter-route current flowing through the connection path LB.

Further, a reactor 38 is also disposed in the connection path LB and is connected in series to the switch unit 20. The reactor 38 is disposed in the connection path LB closer to the second route ES2 than to the switch unit 20. The reactor 38 has a given inductance component ZB as will be described later in detail. Hence, according to one embodiment of the present disclosure, the reactor 38 corresponds to (i.e., acts as) an inductance.

Further, a controller 40 is provided in the power supply system and generates first and second switching signals SC1 and SC2 based on a detection value detected by the current detector 26 to switch states of the first and second switches SW1 and SW2. The controller 40 then outputs commands composed of the first and second switching signals SC1 and SC2 to the first and second switches SW1 and SW2, respectively. The controller 40 also generates a control signal SD to control a converter 12 and outputs a command composed of the control signal SD to the converter 12. The control signal SD then switches a state of the converter 12 between an operating state and an operation stopped state.

The controller 40 is also connected to an information section 44, an IG (Ignition) switch 45, and an input section 46, and controls these devices. The information section 44 visually or audibly provides information to a driver, and is composed of, for example, a display or a speaker installed in a vehicle interior. The IG switch 45 serves as a vehicle starting switch. Hence, the controller 40 monitors on-off state of the IG switch 45. The input section 46 accepts various operations from the driver, for example, operations of a handle, a lever, and a button. Operations of a pedal and a voice input device are also exemplified.

The controller 40 manually and autonomously drives a vehicle by using the above-described specific load 32. Hence, the controller 40 includes a well-known microcomputer composed of a CPU (Central Processing Unit), a ROM (Read Only Memory), and a RAM (Random Access Memory). The controller 40 also includes a flash memory or the like. With this, the CPU realizes various functions of manual driving and autonomous driving with reference to arithmetic program and control data stored in the ROM.

Here, the manual driving represents a driving manner in which the vehicle is driven and controlled by operation of a driver. By contrast, the autonomous driving represents a driving manner in which the vehicle is driven and controlled based on control content determined by the controller 40 excluding operation by the driver. Specifically, the autonomous driving is ranked at level 3 or higher among levels 0 to 5 of an autonomous driving level specified by the National Highway Traffic Safety Administration (NHTSA) of USA. Specifically, with autonomous driving at level 3, the controller 40 can control both steering wheel operation and acceleration and deceleration based on observation of a running environment.

Further, the controller 40 is also enabled to perform a driving assistance function, such as LKA (Lane Keeping Assistance), LCA (Lane Change Assistance), PCS (Pre-Crash Safety), etc., by using the above-described specific load 32. Here, the driving assistance function is performed both when a driver manually drives a vehicle by using the driving assistance function and when the vehicle is driven autonomously.

Further, when a vehicle runs based on the manual driving and the autonomous driving, the controller 40 determines whether an abnormality has occurred in any one of the first route ES1 and the second route ES2. Then, when the controller 40 concludes that no abnormality has occurred in any one of the routes ES1 and ES2, autonomous driving and driving assistance are performed in a vehicle by using the first load 34 and the second load 36. With this, the first and second loads 34 and 36 cooperate with each other to achieve one function necessary for the autonomous driving and the driving assistance. In this embodiment, the abnormality represents a power supply loss abnormality, such as a ground fault, wire breakage, etc.

By contrast, when it is determined that an abnormality has occurred in any one of the routes ES1 and ES2, the first and second switches SW1 and SW2 are switched off, thereby electrically isolating the first route ES1 and the second route ES2 from each other. Hence, even if an abnormality occurs in any one of the routes ES1 and ES2, one of loads 34 and 36 of the other one of the routes ES1 and ES2 in which the abnormality does not occur can be operated.

Further, when it is determined that no abnormality has occurred in each of the routes ES1 and ES2, power is supplied from the converter 12 to the first load 34 and the second load 36. Simultaneously, power is supplied from the converter 12 to both the first low-voltage storage battery 14 and the second low-voltage storage battery 16, thereby allowing the first low-voltage storage battery 14 and the second low-voltage storage battery 16 to start charging. Hence, power supplied from the converter 12 may sometimes cause the first low-voltage storage battery 14 and the second low-voltage storage battery 16 to overcharge. Since an electrical storage capacity of the second low-voltage storage battery 16 is smaller than that of the first low-voltage storage battery 14, there is a risk that the second low-voltage storage battery 16 overcharges.

In view of this, according to this embodiment, a switch unit 24 is disposed between the connection point PB connecting to the connection path LB and the second low-voltage storage battery 16 in the second route ES2. Hereinafter, to distinguish from each other, the switch unit 20 is referred to as a first switch unit 20, and the switch unit 24 is referred to as a second switch unit 24. The second switch unit 24 includes a third switch SW3 to which a diode component DA3 is connected in parallel. Specifically, an anode of the diode component DA3 is disposed closer to the second low-voltage storage battery 16 than a cathode thereof, and the cathode is disposed closer to the connection path LB than the anode. In other words, the third switch SW3 has the diode component DA3 disposed with a forward direction thereof being extended from the second low-voltage storage battery 16 to the connection path LB. Hence, according to one embodiment of the present disclosure, the third switch SW3 corresponds to (i.e., acts as) a switch or a first switch.

With this, it is determined whether the second low-voltage storage battery 16 is in a fully charged condition. When it is determined that the second low-voltage storage battery 16 in the fully charged condition, a switch-off command is output to the third switch SW3 to switch off (i.e., an open state) the third switch SW3 as a control process. Hence, in the fully charged condition of the second low-voltage storage battery 16, the second low-voltage storage battery 16 is stopped charging and allowed to appropriately discharge due to the diode component DA3. As a result, the second low-voltage storage battery 16 can be inhibited from overcharging.

Further, in addition to the third switch SW3, the second switch unit 24 also includes a fourth switch SW4 serially connected to the third switch SW3. As shown, the third switch SW3 is disposed closer to the connection path LB than the fourth switch SW4 is in the second switch unit 24. Hence, in one embodiment of the present disclosure, the second switch unit 24 corresponds (i.e., acts as) a switching circuit, and the fourth switch SW4 corresponds (i.e., acts as) a second switch.

Further, the third and fourth switches SW3 and SW4 of this embodiment are composed of MOSFETs, respectively. Hence, a third parasitic diode DA3 is connected in parallel to the third switch SW3 to act as the diode component DA3. A fourth parasitic diode DA4 is also connected in parallel to the fourth switch SW4. Specifically, the third and fourth switches SW3 and SW4 are connected in series with directions of the third and fourth parasitic diodes DA3 and DA4 being opposite to each other in this embodiment. More specifically, an anode of the fourth parasitic diode DA4 is disposed closer to the connection path LB than a cathode thereof is, and the cathode is disposed closer to the second low-voltage storage battery 16 than the anode is.

Further, the controller 40 generates third and fourth switching signals SC3 and SC4 to switch states of third and fourth switches SW3 and SW4 based on a charged condition of the second low-voltage storage battery 16, and outputs commands composed of the third and fourth switch signals SC3 and SC4 to the third and fourth switches SW3 and SW4, respectively.

Figure 2:
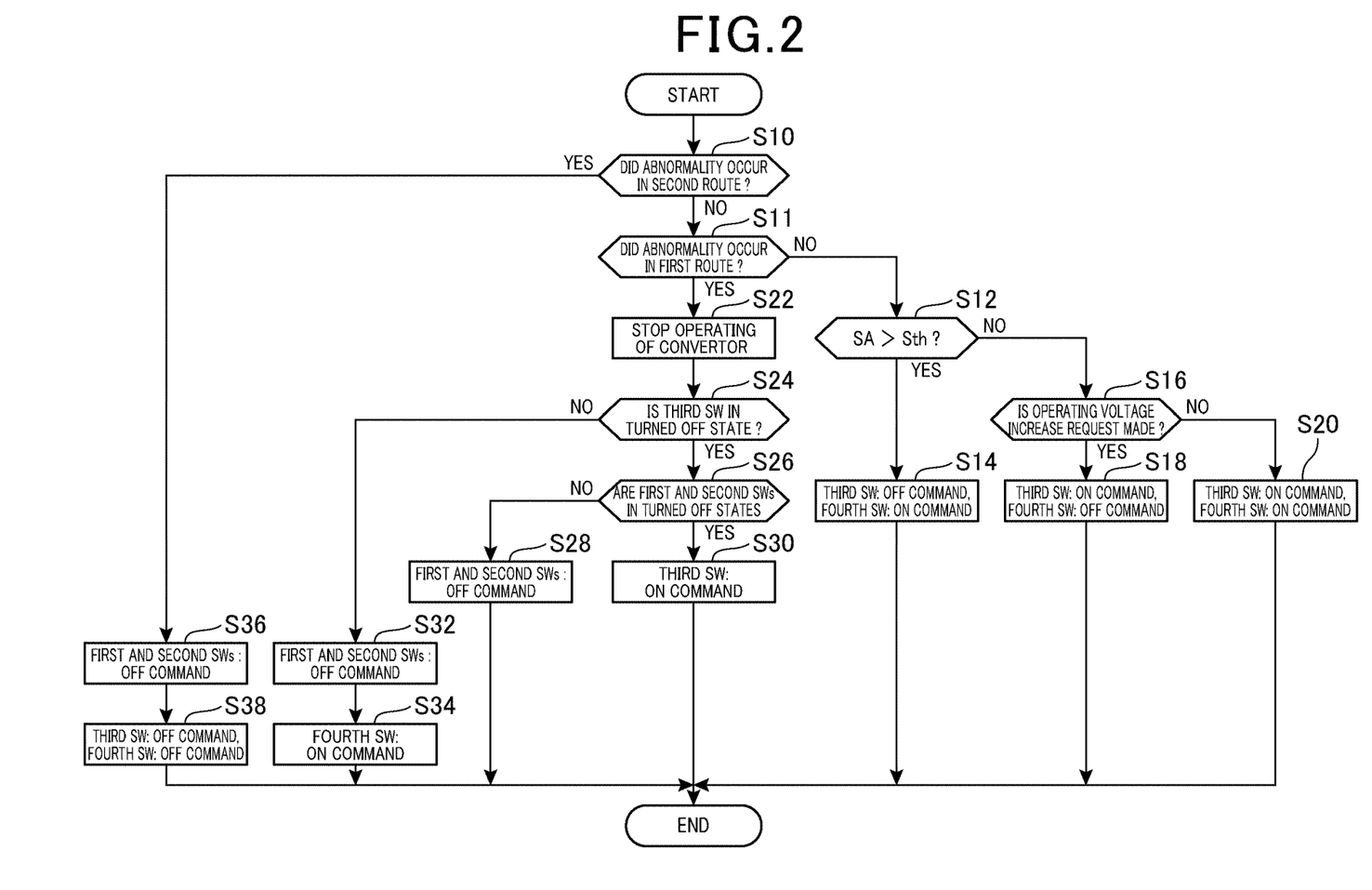
FIG. 2 is a flowchart illustrating an exemplary sequence of a control process according to one embodiment of the present disclosure.

Now, an exemplary control process performed according to one embodiment of the present disclosure is described with reference to FIG. 2. That is, FIG. 2 is a flowchart illustrating the exemplary control process. As shown, when the IG switch is switched to an ON state (i.e., closed state), a control process is repeatedly performed in a given control cycle. Here, at a beginning of switching the IG switch 45 to the ON state, each of the first and second switches SW1 and SW2 is in an ON state, and the converter 12 is in an operating state.

When the control process is started, it is determined first in steps S10 and S11 whether an abnormality has occurred in any one of the first route ES1 and the second route ES2. Specifically, in step S10, it is determined whether an abnormality has occurred in the second route ES2. When a determination in step S10 is negative (No, in step S10), it is subsequently determined in step S11 whether an abnormality has occurred in the first route ES1. Hence, according to one embodiment of the present disclosure, the process of step S11 corresponds to acts as an abnormality determiner.

In performing steps S10 and S11, occurrence of the abnormality can be detected based on a magnitude and a direction of inter-route current detected by the current detector 26. For example, when a ground fault occurs in the first route ES1, the inter-route current detected by the current detector 26 flows in a direction from the second route ES2 to the first route ES1. In addition, a magnitude of the inter-route current detected by the current detector 26 exceeds an upper limit of a normal current range. Further, when a ground fault occurs in the second route ES2, for example, an inter-route current detected by the current detector 26 flows in an opposite direction from the first route ES1 to the second route ES2. In addition, a magnitude of the inter-route current detected by the current detector 26 exceeds the upper limit of the normal current range. Hence, in accordance with the size and the direction of the inter-route current detected by the current detector 26, which of the routes ES1 and ES2 caused the abnormality can be identified.

Further, when it is determined that no abnormality has occurred in each of the routes ES1 and ES2, a determination in step S11 is negative (No, in step S11). In such a situation, it is subsequently determined in step S12 whether the second low-voltage storage battery 16 is in a fully charged condition. Hence, in this embodiment, the process of step S12 corresponds (i.e., acts as) a charged condition determiner as claimed.

Specifically, in step S12, data of a remaining capacity SA (for example, SOC (State Of Charge)) of the second low-voltage storage battery 16 is acquired via a battery monitor (not illustrated), and is compared with a given full charge threshold Sth (for example, 90% of the SOC). When the remaining capacity SA of the second low-voltage storage battery 16 is greater than the full charge threshold Sth, it is determined that the second low-voltage storage battery 16 is in the fully charged condition to make positive determination in step S12 (Yes, in step S12). In such a situation, a switch-off command is subsequently output to the third switch SW3 in step S14, and a switch-on command is simultaneously output to the fourth switch SW4 in step S14, thereby completing the control process.

By contrast, when the remaining capacity SA of the second low-voltage storage battery 16 is smaller than the full charge threshold Sth, it is determined that the second low-voltage storage battery 16 is not in the fully charged condition to provide a negative determination in step S12 (No, in step S12). In such a situation, it is subsequently determined in step S16 whether an operating voltage raising request has been made to raise an operating voltage VM generated by the converter 12.

This is because, depending on an operating state of each of the first load 34 and the second load 36, a remaining capacity of the first low-voltage storage battery 14 can sometimes be smaller than a given over discharge threshold (for example, 10% of a SOC). However, the first low-voltage storage battery 14 is used to supply a dark current to the second route ES2 through a dark current supply path (not illustrated) during a deactivation state of the power supply system 100. Accordingly, a charging request is sometimes generated to permit the first low-voltage storage battery 14 to charge. As a result, when the charging request occurs for the first low-voltage storage battery 14 to charge, it is necessary to let the first low-voltage storage battery 14 rapidly charge to raise the operating voltage VM. Hence, the operating voltage raising request is sometimes generated.

In such a situation, when the raising request has been generated, the determination in step S16 becomes positive (Yes, in step S16). However, in such a situation, when the second low-voltage storage battery 16 charges based on the operating voltage VM raised based on the operating voltage raising request, the second low-voltage storage battery 16 may accordingly overcharge. Hence, the second low-voltage storage battery 16 is charged in such a manner that a charge amount that the second low-voltage storage battery 16 charges is limited. Hence, the operating voltage raising request is substantially equivalent to a charge request for allowing the second low-voltage storage battery 16 to charge in a restricted charging condition. Accordingly, according to one embodiment of the present disclosure, a process performed in step S16 corresponds to a charge amount limitation determiner.

Specifically, when the determination is positive in step S16 (Yes, in step S16), a switch-on command is output to the third switch SW3 and a switch-off command is output to the fourth switch SW4 in step S18, thereby terminating the control process.

By contrast, if an operating voltage raising request is not generated, determination is negative in step S16 (No, in step S16). In such a situation, a switch-on command is output to the third switch SW3 and a switch-on command is also output to the fourth switch SW4 in step S20, thereby terminating the control process.

Further, when it is determined that an abnormality has occurred in any one of the routes ES1 and ES2, a switch-off command is output to each of the first and second switches SW1 and SW2, thereby stopping power supply to the system where the abnormality has occurred. Specifically, when determination is positive in step S10 (Yes, in step S10), a switch-off command is firstly output to each of the first and second switches SW1 and SW2 in step S36. Subsequently, in step S38, a switch-off command is output to each of the third and fourth switches SW3 and SW4, thereby terminating the control process. As a result, the second low-voltage storage battery 16 is stopped charging and discharging, while power supply to the second load 36 is stopped.

Further, when the determination is positive in step S11 (Yes, in step S11), a command is firstly output a command switching a state of the converter 12 into an operation stop state in step S22. Subsequently, in step S24, it is determined whether the third switch SW3 is in a switched-off state.

Specifically, in step S24, when the third switch SW3 is in an ON state, for example, in response to one of on-commands generated in steps S18 and S20 and then it is determined that the abnormality has occurred in the first route ES1, determination in step S24 becomes negative (No, in step S24). In such a situation, a switch-off command is subsequently output to each of the first and second switches SW1 and SW2 in step S32. Subsequently, in step S34, a switch-on command is output to the fourth switch SW4, thereby terminating the control process. As a result, power supply from the second low-voltage storage battery 16 to the second load 36 is secured (i.e., maintained).

By contrast, in step S24, when the third switch SW3 is switched off, for example, in response to the off-command generated in step S14 and it is then determined that the abnormality has occurred in the first route ES1, the determination in step S24 becomes positive (Yes, in step S24). In such a situation, it is subsequently determined whether each of the first and second switches SW1 and SW2 is in a switched-off state in step S26.

In step 26, when the determination is negative (No, in step S26), a switch-off command is output to each of the first and second switches SW1 and SW2 in step S28, thereby terminating the control process. Specifically, when it is determined that the abnormality has occurred in the first route ES1 after the third switch SW3 is switched off in response to the off-command generated in step S14, the switch-off command is output to each of the first and second switches SW1 and SW2.

By contrast, in step S26, when determination is positive (Yes, in step S26), a switch-on command is output to the third switch SW3 in step S30, thereby terminating the control process. That is, after the first and second switches SW1 and SW2 are switched off in response to off-commands generated in step S28, a switch-on command is output to the third switch SW3. Hence, according to one embodiment of the present disclosure, processes performed in steps S14, S18, S20, S30, S34, and S38 collectively correspond to (i.e., act as) a switch state controller.

Figure 3:
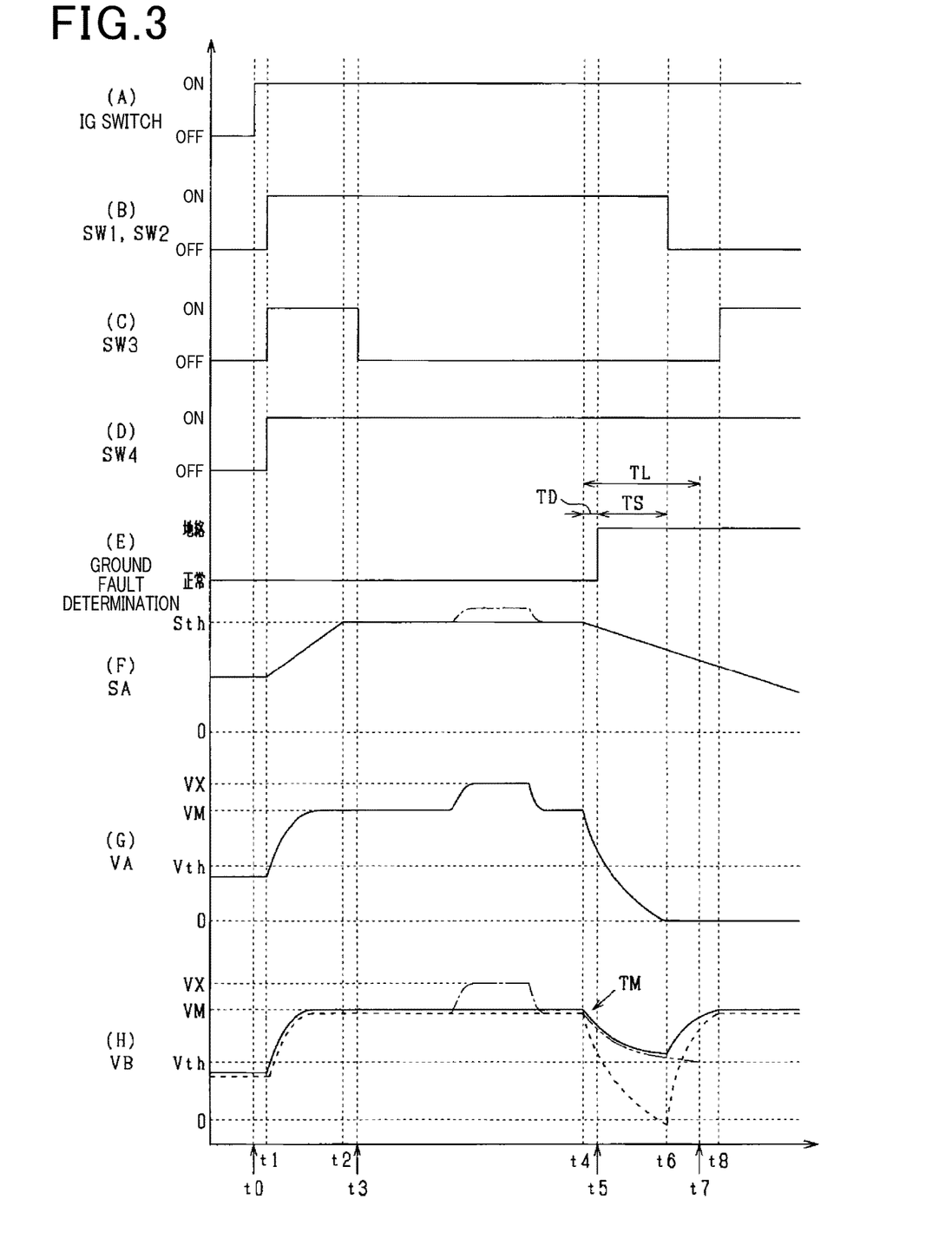
FIG. 3 is a time chart illustrating an exemplary control process performed when a ground fault occurs in a first route according to one embodiment of the present disclosure.

Herein below, an exemplary control process will be described with reference to FIGS. 3 to 5. FIG. 3 illustrates transition of a first voltage VA applied to the first load 34 disposed in the first route ES1 when a vehicle is running and a ground fault occurs in the first route ES1 after the second low-voltage storage battery 16 is fully charged. FIG. 3 also illustrates transition of a second voltage VB applied to a portion of the second route inner path LA2 between the second low-voltage storage battery 16 and the second switch unit 24 when the vehicle is running and the ground fault occurs in the first route ES1 after the second low-voltage storage battery 16 is fully charged.

Specifically, in FIG. 3, a chart A illustrates transition of a state of the IG switch 45. A chart B illustrates transition of an on-off state of each of the first and second switches SW1 and SW2. A chart C also illustrates transition of an on-off state of the third switch SW3. A chart D also illustrates transition of an on-off state of the fourth switch SW4. Further, a chart E illustrates transition of a determination result of a ground fault. A chart F also illustrates transition of a remaining capacity SA of the second low-voltage storage battery 16. A chart G illustrates transition of the first voltage VA. A chart H illustrates transition of the second voltage VB.

More specifically, in the chart H, a solid line indicates transition of the second voltage VB caused when a reactor 38 is disposed in the connection path LB according to this embodiment. A broken line indicates transition of a second voltage VB of a comparative example in which a reactor 38 is not disposed in the connection path LB. Further, a two-dot chain line indicates transition of a second voltage VB decreasing when the ground fault occurs in the first route ES1. Further, in each of the charts F and H, a one-dot chain line indicates transition of the applicable value (SA, VB) caused when a second low-voltage storage battery 16 is determined to be in the full charge condition but the third switch SW3 is not switched off.

Further, as shown in FIG. 3, during an off period of the IG switch 45 to time t1 (i.e., a halt state of the power supply system 100), the first to fourth switches SW1 to SW4 are switched off and a state of the converter 12 is switched to an operation stop state.

When the IG switch 45 is switched on at time t0, a switch-on command is output to each of the first to fourth switches SW1 to SW4, and another command is output to the converter 12 to switch the state of the converter 12 to an operating state. With this, at time t1, each of the first to fourth switches SW1 to SW4 is subsequently brought to an ON state, and the state of the converter 12 is switched to the operating state. As a result, each of the first voltage VA and the second voltage VB rises to an operating voltage VM, and the second low-voltage storage battery 16 starts charging (i.e., storing an electric charge), thereby increasing a remaining capacity SA thereof.

Subsequently, when the remaining capacity SA increases up to a full charge threshold Sth at time t2, a switch-off command is output to the third switch SW3, and the third switch SW3 is subsequently switched off at time t3. That is, when the remaining capacity SA increases up to the full charge threshold Sth and it is accordingly determined that the second low-voltage storage battery 16 is in the fully charged condition, the ON command is output to the third switch SW3 thereby switching off the third switch SW3.

Hence, as shown in the charts G and H, even if the operating voltage VM generated by the converter 12 rises up to a risen voltage VX based on a request for raising the operating voltage VM during a period from time t3 to time t4, the second voltage VB is inhibited from rising to the risen voltage VX (see FIG. 3H, a one-dot line). With this, as shown in the chart F, the remaining capacity SA is inhibited from exceeding the full charge threshold Sth and the second low-voltage storage battery 16 is inhibited from entering an over discharging condition.

Here, during the period from time t3 to time t4, the second low-voltage storage battery 16 is enabled to discharge via the third parasitic diode DA3 of the third switch SW3. In this embodiment, however, since power supply from the converter 12 is continued during the period from time t3 to time t4, the second low-voltage storage battery 16 does not discharge and the remaining capacity SA is maintained at the full charge threshold Sth.

Further, it is determined if a ground fault has occurred during running of a vehicle in any one of the first route ES1 and the second route ES2. When it is determined that no ground fault has occurred in each of the routes ES1 and ES2, each of the first and second switches SW1 and SW2 is maintained in an ON state. With this, power can be supplied from the converter 12 and the first and second low-voltage storage batteries 14 and 16 to the first and second loads 34 and 36. Specifically, the converter 12 enables continuous power supply even during long-term autonomous driving. At the same time, power supply from each of the first and second low-voltage storage batteries 14 and 16 enables power supply with low voltage fluctuations.

By contrast, when it is determined that a ground fault has occurred in any one of the routes ES1 and ES2, a state of each of the first and second switches SW1 and SW2 is switched to a switched-off state as described below. Specifically, in the control process shown in FIG. 3, it is assumed that a ground fault occurs in the first route ES1 at time t4 after the third switch SW3 is switched off. Hence, at time t4, the first voltage VA and the second voltage VB start decreasing. When the inter-route current starts rising and it is thereafter determined at time t5 that a magnitude of the inter-route current becomes greater than an upper limit of a normal current range, it is then determined that the ground fault has occurred. Then, at time t5, a switch-off command is output to each of the first and second switches SW1 and SW2.

Subsequently, the first and second switches SW1 and SW2 are switched off at time t6. That is, based on an event in that the third switch SW3 is in the switched-off state and the ground fault occurs in the first route ES1, a switch-off command is output to each of the first and second switches SW1 and SW2 and brings each of these switches SW1 and SW2 to the switched-off state.

Further, in this embodiment, when each of the first and second switches SW1 and SW2 is brought to the switched-off state, the third switch SW3 is in the switched-off state. However, power supply from the second low-voltage storage battery 16 is enabled via the third parasitic diode DA3 of the third switch SW3. Hence, after the first and second switches SW1 and SW2 are switched off at time t6, the second load 36 is continuously operated based on the power supplied from the second low-voltage storage battery 16.

Here, a period from time t5 to time t6 is determined based on a switching speed at which each of the first and second switches SW1 and SW2 is switched and the like. Hence, the period from time t5 to time t6 is hereinafter referred to as a shut-off period TS. That is, the shut-off period TS is a period from a time when it is determined that a ground fault has occurred in the first route ES1 to a time the first and second switches SW1 and SW2 enter a switched-off state. Further, during the shut-off period TS, since each of the first and second switches SW1 and SW2 is not brought to a switched-off state, the second voltage VB decreases. That is, the second voltage VB continuously decreases during the period from time t4 to time t6.

Specifically, as shown by a broken line in the chart H, if the reactor 38 is not disposed in the connection path LB, the second voltage VB decreases in accordance with a time constant determined based on an inductance component ZA2 included in the second route ES2. In such a situation, since the inductance component ZA2 of the second route ES2 is relatively small, the time constant identified by the inductance component ZA2 is relatively small. Hence, as shown in the charts G and H, the second voltage VB decreases substantially at the same speed as the first voltage VA does. At the same time, the first voltage VA decreases to less than a lower limit Vth of the operating voltage VM during the shut-off period TS. As a result, operation of the second load 36 is interrupted after the shut-off period TS before the second voltage VB rises more the lower limit Vth of the operating voltage VM. Accordingly, when a vehicle is autonomously operated and the interruption of operation occurs thereby losing a function of the second load 36, since a driver cannot control the vehicle, he or she cannot secure driving safety.

In view of this, according to this embodiment, the reactor 38 is disposed in the connection path LB. Then, the second voltage VB is controlled to decrease lower than the lower limit Vth of the operating voltage VM at time t7 which is after the shut-off period TS (see a two-dot chain line in chart H of FIG. 3) in accordance with a time constant TM identified by the inductance component ZA2 of the second route ES2 and an inductance component ZB of the reactor 38. With this, even if a ground fault occurs in the first route ES1, the second voltage VB remains higher than the lower limit Vth of the operating voltage VM. As a result, before the first and second switches SW1 and SW2 are switched off at time t6, the second load 36 is continuously operated based on power supplied from the second low-voltage storage battery 16.

Specifically, a given value of the inductance component ZB of the rector 38, which causes a time constant TM of a circuit composed of the second route ES2 and the connection path LB to meet a condition that a voltage of the second load 36 does not decrease lower than the lower limit Vth of the operating voltage VM during the shut-off period TS is previously designated.

To describe this more in detail, it is premised herein below that the period from time t4 to time t5 corresponds to a determination period TD. That is, the determination period TD is a period from a time a ground fault occurs in the first route ES1 to a time it is determined that the ground fault has occurred in the first route ES1. It is also premised herein below that a period from time t4 to time t7 corresponds to a descending period TL. The descending period TL is a period from a time a ground fault occurs in the first route ES1 to a time the voltage of the second load 36 decreases lower than the lower limit Vth of the operating voltage VM. Then, a given inductance component ZB of the reactor 38, which causes a time constant TM identified by the inductance component ZA1 of the first route ES1 and the inductance component ZB of the reactor 38 to satisfy the below listed first equation.

$$TL > TD + TS \quad \text{(First Equation)}$$

Subsequently, a switch-on command is output to the third switch SW3 and switches on the third switch SW3 (i.e., the third switch SW3 enters a switched-on state) at time t8. That is, after the first and second switches SW1 and SW2 are switched off, the ON command is output to the third switch SW3 and switches on the third switch SW3. Hence, a path through which power is supplied from the second low-voltage storage battery 16 is switched from a path extended via the third parasitic diode DA3 of the third switch SW3 to another path extended via a switch section thereof. With this, power consumption of the second low-voltage storage battery 16 due to a forward voltage of the third parasitic diode DA3 is reduced, thereby prolonging an operation period of the second load 36 when a ground fault has occurred in the first route ES1.

Figure 4:
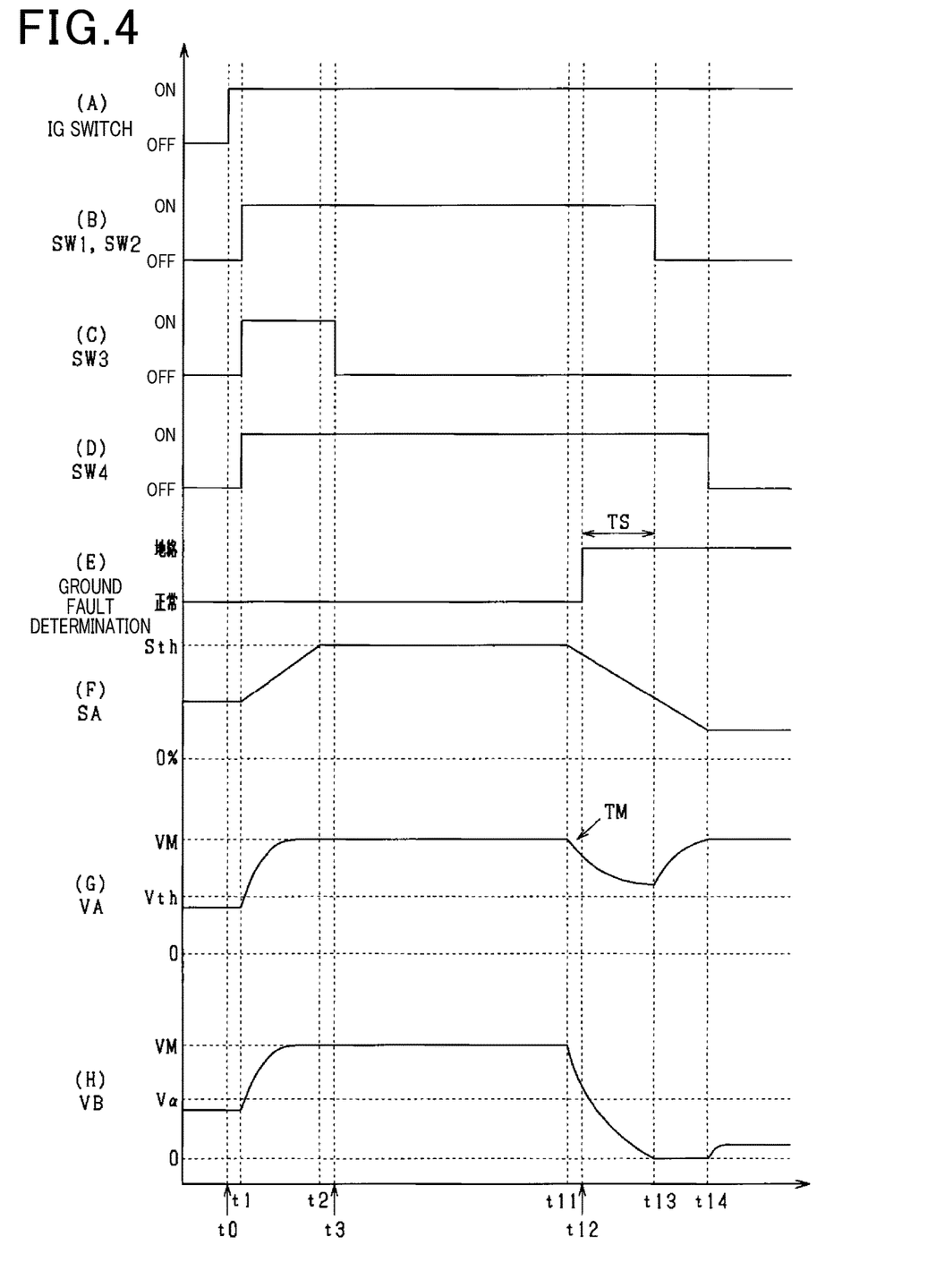
FIG. 4 is a time chart illustrating an exemplary control process performed when a ground fault occurs in a second route according to one embodiment of the present disclosure.

FIG. 4 illustrates transition of a first voltage VA and a second voltage VB when a vehicle is running and a ground fault has occurred in the second route ES2 after the second low-voltage storage battery 16 has fully charged (i.e., full of electric charges). Herein below, since charts A to H of FIG. 4 are substantially the same as the charts A to H of FIG. 3, respectively, descriptions are not repeated. Also, in FIG. 4, since a process performed before time t3 is substantially the same as the process described with reference to FIG. 3, description is not repeated.

First, in the control process of FIG. 4, it is assumed that a ground fault occurs in the second route ES2 at time t11 which is after the third switch SW3 is switched off. Hence, at time t11, the first voltage VA and the second voltage VB start decreasing. Subsequently, when an inter-route current starts rising and it is determined that a magnitude of the inter-route current increases greater than an upper limit of a normal current range at time t12, it is determined that a ground fault has occurred. Then, at time t12, a switch-off command is output to each of the first and second switches SW1 and SW2.

Subsequently, the first and second switches SW1 and SW2 are switched off (i.e., brought to a switched-off state) at time t13. Then, in this embodiment, the first voltage VA is controlled to decrease lower than the lower limit Vth of the operating voltage VM after the shut-off period TS has elapsed in accordance with a time constant TM identified by an inductance component ZA1 of the first route ES1 and the inductance component ZB of the reactor 38. With this, even if the ground fault occurs in the second route ES2, the first voltage VA is maintained at a higher level than the lower limit Vth of the operating voltage VM, so that the first load 34 is continuously operated by receiving power from the converter 12 and the first low-voltage storage battery 14.

Subsequently, a switch-off command is output to the fourth switch SW4, thereby switching off the fourth switch SW4 at time t14. With this, power supply from the second low-voltage storage battery 16 is completely shut-off by the third switch SW3 and the fourth switch SW4 with the parasitic diodes DA 3 and DA 4 directed in opposite directions to each other. As a result, a remaining capacitance SA stops decreasing at time t14, and the second voltage VB increases to a level corresponding to the remaining capacitance SA.

Figure 5:
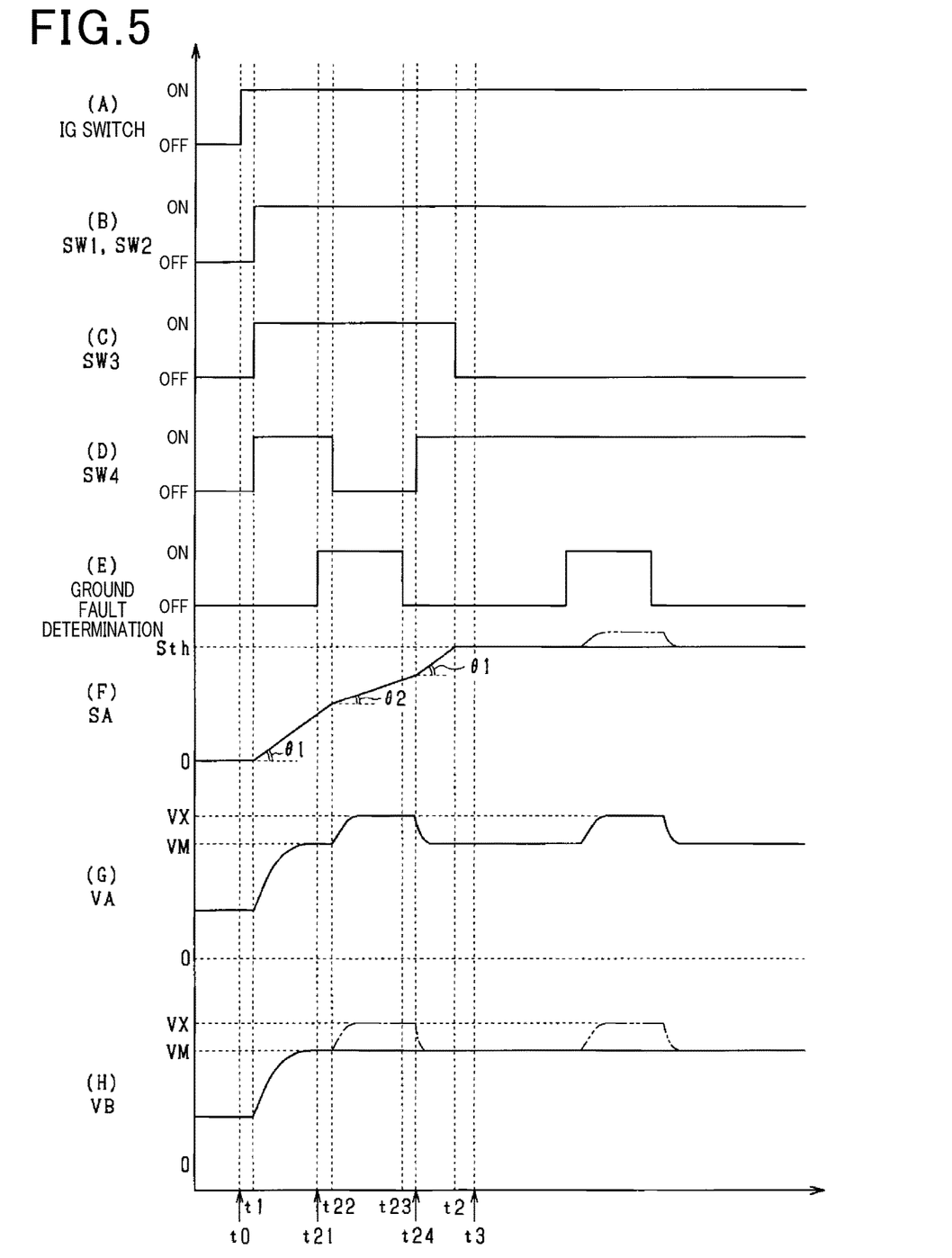
FIG. 5 is a time chart illustrating an exemplary control process performed when an operating voltage raising request occurs before and after a second low-voltage secondary battery becomes fully charged according to one embodiment of the present disclosure.

FIG. 5 illustrates transition of a first voltage VA and a second voltage VB when a vehicle is running and it is determined that an operation voltage raising request has occurred before and after the second low-voltage storage battery 16 has fully charged (i.e., full of electric charges). In FIG. 5, a chart E illustrates transition of determination of whether an operation voltage raising request occurs. That is, in the chart E, a label ON indicates a state in which it is determined that the operation voltage raising request has occurred. A label OFF indicates a state in which it is determined that the operation voltage raising request has not occurred. Since charts A to D and F to H of FIG. 5 are substantially the same as the charts A to D and F to H of FIG. 3, respectively, the same descriptions are not repeated.

Further, in the chart H of FIG. 5, a one-dot chain line indicates transition of the second voltage VB caused when the fourth switch SW4 is not switched off even if it is determined that the operation voltage raising request has occurred. Also, in each of the charts F and H, a two-dot chain line indicates transition of each of applicable values caused when the third switch SW3 is not switched off even if it is determined that the second low-voltage storage battery 16 has fully charged (i.e., full of electric charges).

Further, as shown in FIG. 5, the remaining capacity SA remaining when a state of the IG switch 45 is switched to an ON state is smaller than that shown in each of FIGS. 3 and 4. Hence, a period from time t1 to time t2 is extended to be longer than that shown in each of FIGS. 3 and 4. Here, In FIG. 5, since a process performed before time t1 is substantially the same as the above-described process described with reference to FIG. 3, description thereof is omitted.

Specifically, as shown in FIG. 5, when the first to fourth switches SW1 to SW4 are switched on and a state of the converter 12 is switched to an operating state at time t1, each of the first voltage VA and the second voltage VB rises to an operating voltage VM. At the same time, the second low-voltage storage battery 16 starts charging (i.e., obtains electric charges) thereby increasing the remaining capacity SA. Here, during a period from time t1 to time t22, the remaining capacity SA increases as time elapses at a first increase rate θ1.

Further, in an exemplary control process of FIG. 5, it is determined that the operation voltage raising request has occurred at time t21 before time t2. Hence, a switch-off command is output to the fourth switch SW4 at time t21 and subsequently switches off the fourth switch SW4 at time t22. As a result, the second low-voltage storage battery 16 charges (i.e., obtains electric charges) via the fourth parasitic diode DA4 of the fourth switch SW4.

Hence, when the second low-voltage storage battery 16 charges (i.e., obtains electric charges) via the fourth parasitic diode DA4 in this way, a forward voltage of the fourth parasitic diode DA4 inhibits the second voltage VB from rising to a risen voltage VX even if the operating voltage VM rises up to the risen voltage VX after time t22 (see a single-dot line illustrated in the chart H of FIG. 5). Then, the second low-voltage storage battery 16 continuously charges by obtaining a limited amount of electric charges. Here, a charged amount is equivalent to an amount of a charging current. Hence, an amount of charge in the second low-voltage storage battery 16 decreases to less than that obtained?? via a switch section of the fourth switch SW4, and accordingly the remaining capacity SA increases at a second increase rate θ2 which is smaller than the first increase rate θ1.

Subsequently, when it is determined that the operation voltage raising request has disappeared at time t23, a switch-on command is output to the fourth switch SW4 at the time, thereby subsequently switching on the fourth switch SW4 at time t24. As a result, an amount of charge in the second low-voltage storage battery 16 increases.

Subsequently, when the remaining capacity SA increases up to the full charge threshold Sth at time t2, a switch-on command is output to the third switch SW3, thereby subsequently switching off the third switch SW3 at time t3. Hence, as shown in the charts G and H of FIG. 5, even if the operating voltage VM rises up to the risen voltage VX based on the operation voltage raising request after time t3, the second voltage VB is inhibited from rising to the risen voltage VX (see a two-dot chain line in the chart H of FIG. 5). That is, in the second low-voltage storage battery 16, an amount of electric charges is limited by stopping charging.

As described heretofore, according to one embodiment of the present disclosure, the below-described advantages can be obtained.

First, in one embodiment of the present disclosure, the first and second routes ES1 and ES2 are connected to each other via the connection path LB to perform mutual power supply therebetween. That is, sufficient power supply to the first load 34 and the second load 36 by the converter 12 and the first and second low-voltage storage batteries 14 and 16 is enabled. Specifically, a power supply is composed of the converter 12 that generates the operating voltage VM operating the first load 34 and the second load 36, and the first and second low-voltage storage batteries 14 and 16 enabled to charge by receiving power from the converter 12. As a result, the first and second low-voltage storage batteries 14 and 16 can appropriately charge while providing sufficient power to each of the loads 34 and 36.

In addition to the above-described configuration, this embodiment further includes the third switch SW3 having the third parasitic diode DA3 disposed in the second route ES2 between the connection point PB connecting to the connection path LB and the second low-voltage storage battery 16. The third parasitic diode DA3 is disposed with a forward direction extending from the second low-voltage storage battery 16 to the connection path LB. Then, it is determined whether the second low-voltage storage battery 16 is in a fully charged condition. When it is determined that the second low-voltage storage battery 16 is in the fully charged condition, a switch-off command is output to the third switch SW3 to switch off the third switch SW3. With this, the second low-voltage storage battery 16 in the fully charged condition stops charging while appropriately discharging due to the third parasitic diode DA3. As a result, the second low-voltage storage battery 16 can be inhibited from overcharging.

In another embodiment of the present disclosure, the first and second switches SW1 and SW2 are disposed in the connection path LB. Hence, when it is determined that an abnormality has occurred in the first route ES1, the first and second switches SW1 and SW2 are switched off, and the second load 36 in the second route ES2 in which the abnormality has not occurred is continuously operated. However, in this embodiment, even if the third switch SW3 is in the switched-off state when the first and second switches SW1 and SW2 are switched off, power can be supplied from the second low-voltage storage battery 16 to the second load 36 via the third parasitic diode DA3. With this, even after the first and second switches SW1 and SW2 are switched off, the second load 36 can be continuously operated.

In yet another embodiment of the present disclosure, when the third switch SW3 is in the switched-off state when the first and second switches SW1 and SW2 are switched off, a switch-on command is further output to the third switch SW3 to switch on the third switch SW3 after the first and second switches SW1 and SW2 are switched off. With this, power consumption in the second low-voltage storage battery 16 caused by the forward voltage of the third parasitic diode DA3 is reduced, so that the second load 36 can be continuously operated longer time even after the first and second switches SW1 and SW2 are switched off.

In yet another embodiment of the present disclosure, the inductance 38 is connected in series to the first and second switches SW1 and SW2 in the connection path LB. Then, a value of the time constant TM of the circuit composed of the second route ES2 and the connection path LB is determined based on the inductance component ZB of the inductance 38, such that the value does not allow a voltage of the second load 36 to decrease to less than the lower limit Vth of the operating voltage VM during the shut-off period TS. That is, even if the abnormality occurs in the first route ES1, transitional change in current generated by the abnormality and the inductance component ZB of the inductance 38 collectively generate a transitional difference in voltage between these routes to prevent the voltage of the second load 36 from decreasing less than the lower limit Vth of the operating voltage VM. With this, the second load 36 can be continuously operated before and after each of the first and second switches SW1 and SW2 enters the switched-off state.

Further, in a power supply system 100 applied to a car having the first load 34 and the second load 36 which perform functions necessary for driving of the car, if the second load 36 cannot continuously operate when an abnormality occurs in the first route ES1, operation of the first load 34 and the second load 36 are stopped resulting in discontinuation of driving thereof. In view of this, according to this embodiment, the second load 36 is continuously operated before and after the first and second switches SW1 and SW2 are switched off, the car can be properly operated continuously.

In yet another embodiment of the present disclosure, the third switch SW3 and the fourth switch SW4 are connected in series with each other in the second switch unit 24 with directions of parasitic diodes DA 3 and DA4 thereof being opposite to each other. Hence, by switching respective states of the third switch SW3 and the fourth switch SW4, a charge amount in the second low-voltage storage battery 16 can be appropriately limited.

More specifically, when it is determined that the raising request has been made, the third switch SW3 is switched on and the fourth switch SW4 is switched off. With this, since it charges via the third parasitic diode DA3, the second low-voltage storage battery 16 can continuously charge by limiting an amount of charge. Further, when it is determined that the second low-voltage storage battery 16 is in a fully charged condition, the third switch SW3 is switched off and the fourth switch SW4 is switched on. With this, the second low-voltage storage battery 16 is stopped charging and thereby limiting an amount of charge in the second low-voltage storage battery 16.

That is, in a power supply system 100 including the converter 12 and the second low-voltage storage battery 16, it is necessary to raise the operating voltage VM generated by the converter 12, for example, in accordance with operating states of the first load 34 and the second load 36. In such a situation, when the second low-voltage storage battery 16 charges based on the risen voltage VX, the second low-voltage storage battery 16 may overcharge. Hence, in this embodiment of the present disclosure, when a raising request for raising the operating voltage VM is made, the third switch SW3 is switched on and the fourth switch SW4 is switched off. As a result, the forward voltage of the fourth parasitic diode DA4 of the fourth switch SW4 inhibits rise of the second voltage VB applied to the second low-voltage storage battery 16, thereby enabling suppression of overcharging in the second low-voltage storage battery 16.

The present disclosure is not limited to the above-described embodiments and may include various modifications thereof as described herein below.

First, the moving body is not limited to vehicles, and may be, for example, a ship or an aerial vehicle.

Further, each of the loads 34 and 36 may be the below described device, for example.

Specifically, each of the loads 34 and 36 may be a driving motor and a drive circuit driving the driving motor to collectively provide driving force to an engine. In such a situation, each of the first and second loads 34 and 36 includes, for example, a respective three-phase permanent magnet synchronous motor and a three-phase inverter.

Further, each of the loads 34 and 36 may be an anti-lock brake that prevents a wheel from being locked during braking. In such a situation, each of the first and second loads 34 and 36 includes, for example, an ABS (Automatic Braking System) actuator capable of separately adjusting a hydraulic braking pressure during braking.

Further, each of the loads 34 and 36 may be a cruise controller that detects a front running vehicle running ahead of its own vehicle and maintains a constant vehicular gap therebetween when the front running vehicle is detected. The cruise controller can be a type that runs the own vehicle at a given vehicle speed when the front-running vehicle is no longer detected. In such a situation, each of the first and second loads 34 and 36 may include a millimeter wave radar, for example.

Further, the loads 34 and 36 are not necessarily a combination of the same or similar devices, and may be another combination realized by different types of devices having substantially the same function.

Further, the voltage generator is not limited to the converter 12, and may be, for example, an alternator.

Further, the electrical storage device is not limited to the lithium-ion storage battery and may be a lead-acid battery or a nickel-metal hydride storage battery. Further, the third and fourth switches SW3 and SW4 are not limited to the MOSFETs and may be IGBTs (Insulated Gate Bipolar Transistors), for example. The first and second switches SW1 and SW2 may also be IGBTs. In such a situation, since a parasitic diode is not employed in the IGBT, it is necessary to additionally provide respective freewheel diodes equivalent to the third and fourth parasitic diodes DA3 and DA4.

Further, the inductance disposed in the connection path LB is not limited to the reactor 38. That is, the connection path LB may be extended. In such a situation, the reactor 38 is no longer needed, and the inductance is constituted by an extension of the connection path LB. Hence, the inductance component is equivalent to an inductance component of the extension.

Further, the charging request is not limited to the operating voltage raising request, and may be a charging request generated when the second low-voltage storage battery 16 is charging and the remaining capacity SA approaches the full charge threshold Sth. Further, the charging request may be generated when a voltage fluctuation width of the operating voltage VM generated by the converter 12 exceeds a given level.

Figure 6:
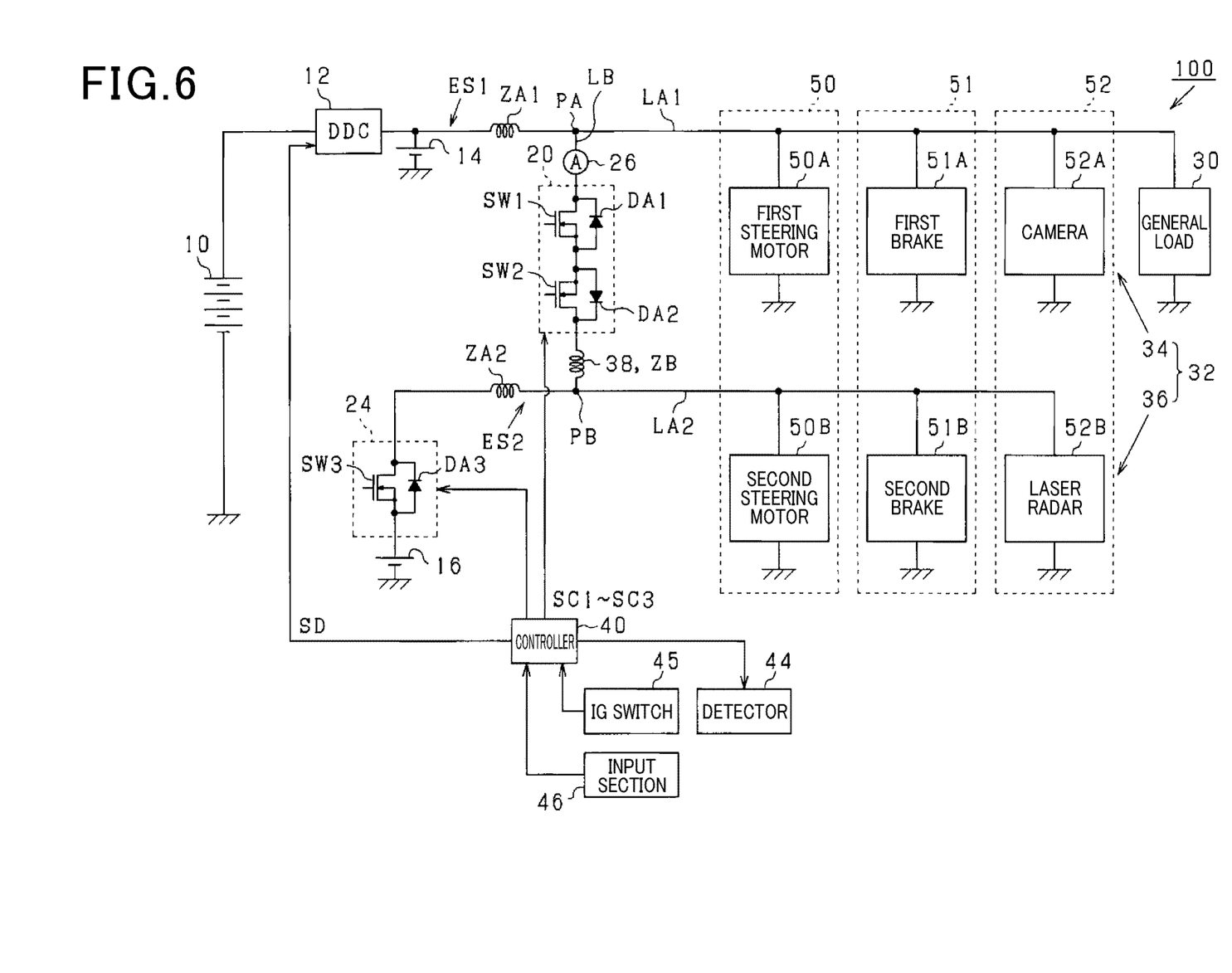
FIG. 6 is a diagram illustrating an overall structure of a power supply system according to another embodiment of the present disclosure.

In the above-described embodiment, the third switch SW3 and the fourth switch SW4 are disposed in the second switch unit 24 as one example, but is not limited thereto. For example, as shown in FIG. 6, the fourth switch SW4 is not necessarily provided. In such a situation, in the control process of FIG. 2, each of the steps S16, S20, and S34 is not performed, and the command is only output to the third switch SW3 in each of steps S14, S18, and S38.

Further, in the above-described embodiment, the single connection path LB is disposed as one an example, but the present disclosure is not limited thereto. That is, two connection paths LB respectively connecting the routes with each other may be disposed. In such a situation, these two connection paths LB and the first and second route inner paths LA1 and LA2 may be connected with each other in an annular state.

Further, in the above-described embodiment, the power supply system 100 is applied to the vehicle for both manual driving and autonomous driving as one example, but the present disclosure is not limited thereto. That is, the power supply system 100 may be applied only to a vehicle for autonomous driving, such as a fully autonomous vehicle, etc. Similarly, the power supply system 100 may be applied only to a vehicle which can only be driven manually.

Specifically, when the power supply system 100 is applied to the vehicle only running based on autonomous driving, for example, and an abnormality occurs in one of the routes ES1 and ES2, a process of the autonomous driving either stops the vehicle either immediately or after moving it to a safe place by using one of the loads 34 and 36 of applicable one of the routes ES1 and ES2 in which the abnormality does not occur.

Further, in the above-described embodiment, when it is determined that an abnormality has occurred in one of the routes ES1 and ES2, power supply is stopped to the applicable one of the routes ES1 and ES2 where the abnormality has occurred as one example. However, the present disclosure is not limited thereto, and power supply to the one of the routes ES1 and ES2 where the abnormality has occurred may be continued with a reduced amount.

Further, the detection method of detecting an abnormality is not limited to the above-described detection method detecting the abnormality based on a current. For example, the abnormality may be detected based on a voltage.

Numerous additional modifications and variations of the present disclosure are possible in light of the above teachings. It is therefore to be understood that within the scope of the appended claims, the present disclosure may be performed otherwise than as specifically described herein. For example, the present disclosure is not limited to the above-described power supply system and may be altered as appropriate.

What is claimed is:

1. A power supply system, comprising:
a first route including a first power supply connected to a first load;
a second route including a second power supply connected to a second load;
a connection path connecting the first and second routes with each other, the connection path connecting to the second route at a connection point;
a voltage generator of the first power supply, the voltage generator generating an operating voltage operating each of the first load and the second load;
an electrical storage device of the second power supply, the electrical storage device charging based on power supplied from the voltage generator;
a switching circuit disposed in the second route between the connection point and the electrical storage device, the switching circuit including a first switch having a diode component with an anode and a cathode being directed to the electrical storage device and the connection path, respectively;
an inter-route switch disposed in the connection path;
an inductance having a given inductance component connected in series to the inter-route switch in the connection path, the inductance component having a first given value causing a time constant of a circuit composed of the second route and the connection path to have a second given value that inhibits a voltage of the second load from decreasing to less than a lower limit of an operating voltage operating the second load during a shut-off period; and
a processor configured to:
determine whether the electrical storage device is in a fully charged condition;
output a first switch-off command to the first switch it is determined that the electrical storage device is in the fully charged condition;
determine whether an abnormality has occurred in the first route;
output a second switch-off command to the inter-route switch when the first switch is in the switched-off state in response to the first switch-off command and it being determined that the abnormality has occurred in the first route; and
output a switch-on command to the first switch after the inter-route switch has entered a switched-off state in response to the second switch-off command,
wherein the shut-off period represents a period from when the processor has determined that the abnormality has occurred in the first route to when the inter-route switch has entered the switched-off state in response to the second switch-off command.

2. The power supply system as claimed in claim 1, wherein each of two of the first load and the second load is configured to perform at least one common function necessary for driving a moving body.

3. The power supply system as claimed in claim 1, wherein the inter-route switch has a diode component with an anode and a cathode being directed to the connection path and the electrical storage device, respectively, and the inter-route switch is connected in series to the first switch, and
the processor is configured to:
determine whether a restricted charging request for allowing the electrical storage device to charge in a restricted charging condition has been made;
output a switch-on command to the first switch and a switch-off command to the inter-route switch when it is determined that the restricted charging request has been made; and
output a switch-off command to the first switch and a switch-on command to the inter-route switch when it is determined that the electrical storage device is in the fully charged condition.

4. The power supply system as claimed in claim 3, wherein the processor is configured to determine that the restricted charging request has been made when a raising request for raising the operating voltage generated by the voltage generator has been made.

* * * * *